(No Model.)

S. A. SMITH & A. F. ASHBY.
STEW KETTLE AND JACKET.

No. 594,764. Patented Nov. 30, 1897.

Witnesses

Inventors
Sarah A. Smith
and Alexander F. Ashby

Attorney

UNITED STATES PATENT OFFICE.

SARAH A. SMITH AND ALEXANDER F. ASHBY, OF COFFEYVILLE, KANSAS.

STEW-KETTLE AND JACKET.

SPECIFICATION forming part of Letters Patent No. 594,764, dated November 30, 1897.

Application filed February 27, 1897. Serial No. 625,362. (No model.)

*To all whom it may concern:*

Be it known that we, SARAH A. SMITH and ALEXANDER F. ASHBY, citizens of the United States, residing at Coffeyville, in the county of Montgomery and State of Kansas, have invented certain new and useful Improvements in Stew-Kettles and Jackets; and we do declare the following to be a full, clear, and exact description of the invention, such as will enable others skilled in the art to which it appertains to make and use the same.

Our invention has relation to culinary utensils, and more particularly to stew-kettles and jackets. The object is to provide a simple, convenient, and effective utensil of this class whereby all danger of burning or scorching the contents of the kettle is avoided.

To this end the novelty consists in the construction, combination, and arrangement of the same, as will be hereinafter more fully described, and particularly pointed out in the claim.

In the accompanying drawings the same reference-characters indicate the same parts of the invention.

Figure 1:
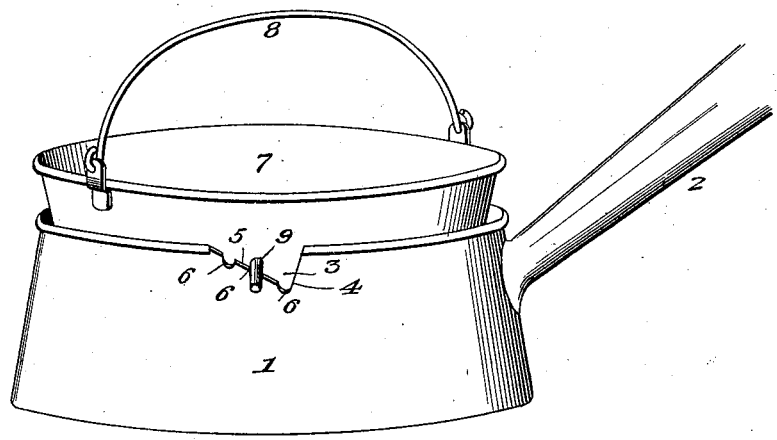
Figure 2:
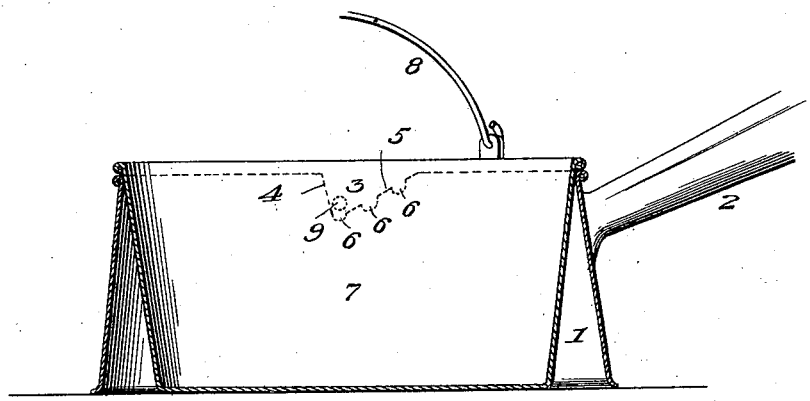

Figure 1 is a perspective view of our improved stew-kettle and its supporting-jacket, and Fig. 2 is a vertical section of the same.

1 represents the supporting-jacket, which is cylindrical in form and tapers from its open bottom to its open top.

2 represents the usual laterally-projecting handle for manipulating the same.

3 3 represent inclines formed at three equidistant points in the upper edge of the jacket 1, one of the walls 4 of said recesses being approximately vertical, while the opposite wall 5 inclines outwardly from the bottom of the recess to the top edge of the jacket. This inclined wall 5 is provided with a series of notches 6 6, arranged one above the other, as shown, each notch gradually increasing in distance from the bottom of the jacket as they approach the top edge thereof.

7 represents the stew-kettle, provided with the usual bail 8, and 9 9 represent laterally-projecting studs arranged at three equidistant points in the same horizontal plane to correspond to the equidistant inclines 3 3 and at such a height from the bottom of the kettle that the distance from the studs to the bottom of the kettle is somewhat greater than the distance from the bottom of the inclines to the bottom of the jacket. This arrangement allows the bottom of the kettle to rest on the stove when the studs 9 are in contact with the vertical wall of the recesses. If now the kettle be raised by its bail and turned a trifle to the left, the studs will rest in one of the horizontal series of notches 6 and the sides of the kettle moved away from the supporting-jacket, so that the heated air is allowed to escape from the jacket, the adjustment being regulated by the degree of heat it is desired the kettle to receive, the degree of heat being in turn regulated by the distance at which the bottom of the kettle is suspended above the top of the stove.

The utensil will be found very convenient, reliable, and effective, answering all the requirements of the usual farina-kettle or water-bath at far less expense and without the objections thereto.

Although we have specifically described the construction and relative arrangement of the several elements of our invention, we do not desire to be confined to the same, as such changes or modifications may be made as clearly fall within the scope of our invention without departing from the spirit thereof.

Having thus fully described our invention, what we claim as new and useful, and desire to secure by Letters Patent of the United States, is—

In a culinary utensil, the combination of a supporting-jacket provided with equidistant inclines, each incline having notches along its surface, of a removable and adjustable vessel having equidistant laterally-projecting studs adapted to rest in said notches, said vessel converging downward from said jacket, by which construction, when the vessel is raised it is moved both away from the source of heat and from the supporting-jacket, substantially as described.

In testimony whereof we hereunto affix our signatures in presence of two witnesses.

SARAH A. SMITH.
ALEXANDER F. ASHBY.

Witnesses:
SAMUEL MCMURTRY,
ORVILLE E. SCURR.